United States Patent [19]
Satoh et al.

[11] Patent Number: 5,781,806
[45] Date of Patent: Jul. 14, 1998

[54] SHAKE CORRECTING APPARATUS FOR CAMERA CAPABLE OF SECURING RAPID PHOTOGRAPHING FUNCTION

[75] Inventors: Tatsuya Satoh, Machida; Yoshinori Matsuzawa, Hachioji; Yasuo Tanbara, Hino; Akira Inoue, Hachioji, all of Japan

[73] Assignee: Olympus Optical Co., Ltd., Tokyo, Japan

[21] Appl. No.: 802,221

[22] Filed: Feb. 19, 1997

Related U.S. Application Data

[63] Continuation of Ser. No. 534,020, Sep. 26, 1995, abandoned.

[30] Foreign Application Priority Data

Sep. 29, 1994 [JP] Japan .................................... 6-235722

[51] Int. Cl.$^6$ ............................. G03B 13/00; G03B 5/00
[52] U.S. Cl. .................... 396/55; 396/52; 396/54
[58] Field of Search ................ 396/52–55; 348/208

[56] References Cited

U.S. PATENT DOCUMENTS

| | | | |
|---|---|---|---|
| 4,970,540 | 11/1990 | Vasey et al. | 354/202 |
| 5,095,198 | 3/1992 | Nakazawa et al. | 354/407 |
| 5,101,230 | 3/1992 | Shikaumi et al. | 354/430 |
| 5,107,293 | 4/1992 | Sekine et al. | 354/430 |
| 5,130,729 | 7/1992 | Sato et al. | |
| 5,192,964 | 3/1993 | Shinohara et al. | 354/202 |
| 5,257,053 | 10/1993 | Kobayashi et al. | 354/195.1 |
| 5,266,981 | 11/1993 | Hamada et al. | 354/400 |
| 5,337,098 | 8/1994 | Imafuji et al. | 354/430 |
| 5,416,554 | 5/1995 | Hamada et al. | 354/400 |

FOREIGN PATENT DOCUMENTS 3-121435  5/1991  Japan.

*Primary Examiner*—Safet Metjahic
*Assistant Examiner*—Michael Dalakis
*Attorney, Agent, or Firm*—Frishauf, Holtz, Goodman, Langer & Chick

[57] ABSTRACT

A shake correcting apparatus for a camera includes a shake detector for detecting a shake state of a camera, a shake correcting section for executing shake correction based on a detection result from the shake detector, and a shake correction driving section for driving the shake correcting section. A relative position detector detects a relative position state of the shake correcting section, and an end position detector detects an end position state of the shake correction section. A discriminator discriminates at least one of an operational status of a camera and history data of shake correction driving. An initial position of shake correction for initialization of the shake correcting section is set based on the detection result from the relative position detector. A driving mode of driving of the shake correcting section to the set initial position is changed based on a discrimination result from the discriminator. Initial-position setting sections may be provided for setting an initial position of the shake correcting section.

19 Claims, 11 Drawing Sheets

1

SHAKE CORRECTING APPARATUS FOR CAMERA CAPABLE OF SECURING RAPID PHOTOGRAPHING FUNCTION

This application is a continuation of application Ser. No. 08/534,020, filed Sep. 26, 1995, now abandoned.

BACKGROUND OF THE INVENTION

1. Field of the Invention

The present invention generally relates to a camera, and, more particularly, to a shake correcting apparatus which prevents the shaking of a camera during exposure by a photo-optical system mounted in the camera.

2. Description of the Related Art

Recently, compact cameras equipped with a high-power zoom lens system have become available.

A compact camera of this type is usually hand-held for taking pictures. When a user takes a picture at a long-focus distance, particularly, the influence of the shaking of the camera cannot be neglected. To prevent the shaking of a camera during exposure, various shake correcting apparatuses have been proposed to prevent the shaking of the photo-optical system.

For instance, one of such shake correcting apparatuses is proposed in Jpn. Pat. Appln. KOKAI Publication No. 3-121435 filed by the assignee of the present application.

When a camera shakes during photographing, this shake correcting apparatus detects the speed of the shaking and rotates the photo-optical system in the direction to cancel the shaking.

When every photographing is completed, the photo-optical system is shifted by the rotary section of the shaking compensating section to the initial position to be ready for the next shooting.

In the aforementioned Jpn. Pat. Appln. KOKAI Publication No. 3-121435, both ends of the range of the rotation of the photo-optical system caused by the centering operation or both ends of the operational range of the shake correcting apparatus (the distance between one end and the other end) are found and the position equivalent to one half of the number of pulses (which are generated by a photointerrupter as position detecting means) between one end and the other end is determined as the center position which is taken as the initial position.

When the time needed for the centering operation which involves the rotation of the photo-optical system is long, the rapid photographing performance of a camera is deteriorated. With an SLR (Single-Lens Reflex) camera in use, when mirror down is performed responsive to the user's release operation for the next shooting during the centering operation after exposure, the user can see the state of the centering operation through the finder, which is undesirable. Therefore, mirror down for the next shooting cannot actually be performed until the centering operation is completed, thus reducing the rapid photographing performance of the camera.

Because the centering operation is carried out after each shot is taken, the consumed power of the battery that is used as the power supply for a camera increases to shorten the battery's life.

SUMMARY OF THE INVENTION

It is therefore an object of the present invention to provide a new and improved shake correcting apparatus for a camera which can set the initial position with the minimum centering operation, can reduce the consumed power and can maintain the rapid photographing function.

According to one aspect of this invention, there is provided a shake correcting apparatus for a camera, which comprises:

shake detecting means for detecting a shake state of a camera;

shake correcting means for executing shake correction based on a detection result from the shake detecting means;

shake correction driving means for driving the shake correcting means;

first initial-position setting means for finding end positions of a correction range of the shake correcting means, and then obtaining a center position from the end positions, the center position being taken as an initial position;

second initial-position setting means for obtaining a difference between a current position of the shake correcting means and the center position and moving the current position of the shake correcting means by the difference for initialization of the shake correcting means to the center position;

discriminating means for discriminating an operational status of the camera or history data of shake correction driving; and selective execution means for selecting either the first initial-position setting means or the second initial-position setting means based on a discrimination result from the discriminating means and causing the shake correcting means to execute initial-position setting operation via the shake correction driving means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated herein and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
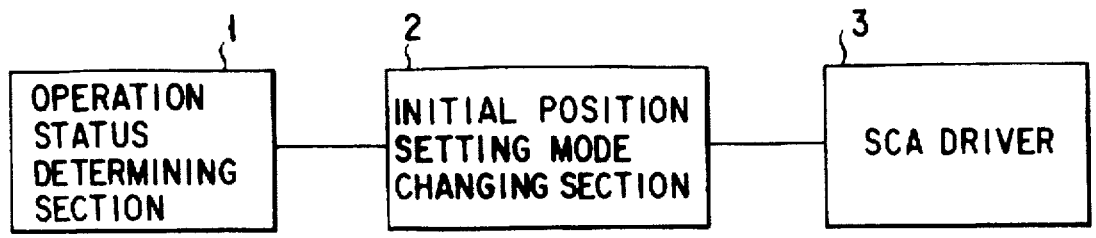
FIG. 1 is a diagram illustrating the conceptual structure of a shake correcting apparatus according to one embodiment of this invention.

Reference will now be made in detail to the presently preferred embodiments of the invention as illustrated in the accompanying drawings, in which like reference characters designate like or corresponding parts throughout the several drawings.

Preferred embodiments of this invention will now be described with reference to the accompanying drawings.

FIG. 1 shows the conceptual structure of a shake correcting apparatus for a camera according to one embodiment of this invention.

The shake correcting apparatus in FIG. 1 comprises an operation status determining section 1 for determining the operational status of a shake-correctable photographing apparatus (camera), an initial-position setting (IPS) mode changing section 2 for selecting how to set the initial position in accordance with the determination based on the operational statuses of the shake correcting apparatus and the camera, and a shake correcting apparatus (SCA) driver 3 which executes the initial-position setting operation and the shake correcting operation according to the selected setting scheme.

In such a shake correcting apparatus, the operation status determining section 1 determines the operational status of the shake-correctable photographing apparatus (camera) and determines the activating status of the shake correcting apparatus and the operational status of the camera which is not concerned with the shake correction. The result of the determination by this operation status determining section 1 is sent to the IPS mode changing section 2, which in turn changes the initial-position setting mode based on the determination result.

A description will now be given of at what status of the IPS mode changing section 2 the initial-position setting mode of the shake correcting apparatus should be altered. The case of the alteration is classified to the case (status) where the multiplication error of the current position data of the shake correcting apparatus is expected to be small, and the case (status) where the multiplication error of the position data is expected to be large and the current position data of the shake correcting apparatus should be initialized. (Both cases will be discussed later.) The IPS mode changing section 2 changes the initial-position setting mode to the one suitable for each case. When the multiplication error is determined to be small, for example, the mode is changed to shorten the time needed to set the initial position and set the shake correcting apparatus to a predetermined (center) position, thereby ensuring the rapid photographing performance. When the multiplication error is determined to be relatively large, on the other hand, the IPS mode changing section 2 instructs to set the initial position of the shake correcting apparatus in such a mode as to cancel the multiplication error while prolonging the time needed for the setting of the initial position.

The SCA driver 3 executes the initial-position setting operation (centering operation) for the shake correcting apparatus in accordance with the instruction from the IPS mode changing section 2.

Figure 2:
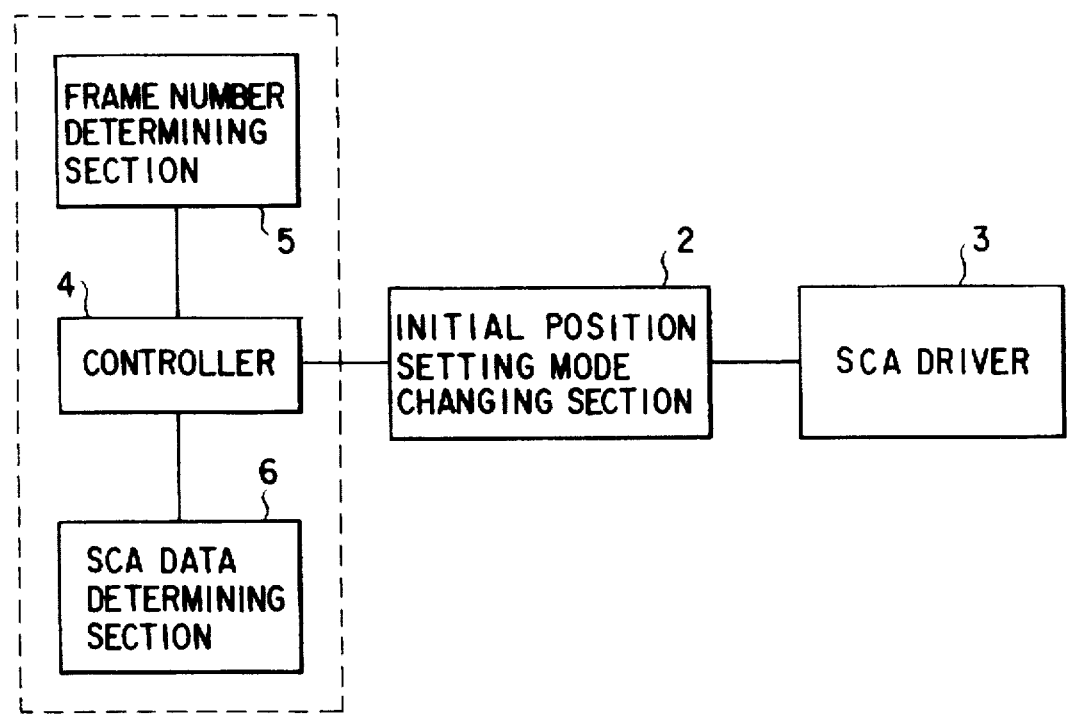
FIG. 2 is a diagram exemplifying the structure of an operation status determining section shown in FIG. 1.

FIG. 2 shows a shake correcting apparatus whose operation status determining section 1 has a more concrete structure.

In this operation status determining section 1, a controller 4 controls the general operation of the camera and the shake detection and the driving which are concerned with the shake correction. Connected to this controller 4 are a frame number determining section 5 and an SCA data determining section 6. The determining section 5 determines if a predetermined number of photographs have been taken based on the frame number data from a frame number counting apparatus (not shown in FIG. 2) in the camera. This frame number data is accompanied with the shake correcting operation. When determining that the predetermined number of photographs have been taken, the determining section 5 sends data to that effect to the controller 4.

Based on the received data, the controller 4 sends an instruction to change the initial-position setting mode of the shake correcting apparatus to the same IPS mode changing section 2 shown in FIG. 1. The reason why the determination of the alteration of the initial-position setting mode is based on the number of pictures taken by the camera is that as the number of pictures taken increases, the frequency of the use of the shake correcting apparatus, we think, also increases so that it is expected, as mentioned earlier, to increase the multiplication error of the current position data of the shake correcting apparatus.

The SCA data determining section 6 determines how much the shake correcting apparatus is used from a change in position data from an SCA position detector (not shown in FIG. 2). When it is determined that the usage status has reached to a predetermined usage status, the determining section 6 sends data to that effect to the controller 4. Upon reception of this data, the controller 4 sends an instruction to change the initial-position setting mode of the shake correcting apparatus to the IPS mode changing section 2. The reason why the alteration of the initial-position setting mode is based on the usage status of the shake correcting apparatus is that as the frequency of the use of the shake correcting apparatus increases, the multiplication error of the current position data (pulses) of the shake correcting apparatus, which will be discussed later, is expected to increase due to the return operation and the low-speed operation of the shake correcting apparatus.

The SCA driver 3 performs the same operation as the one shown in FIG. 1.

Figure 3:
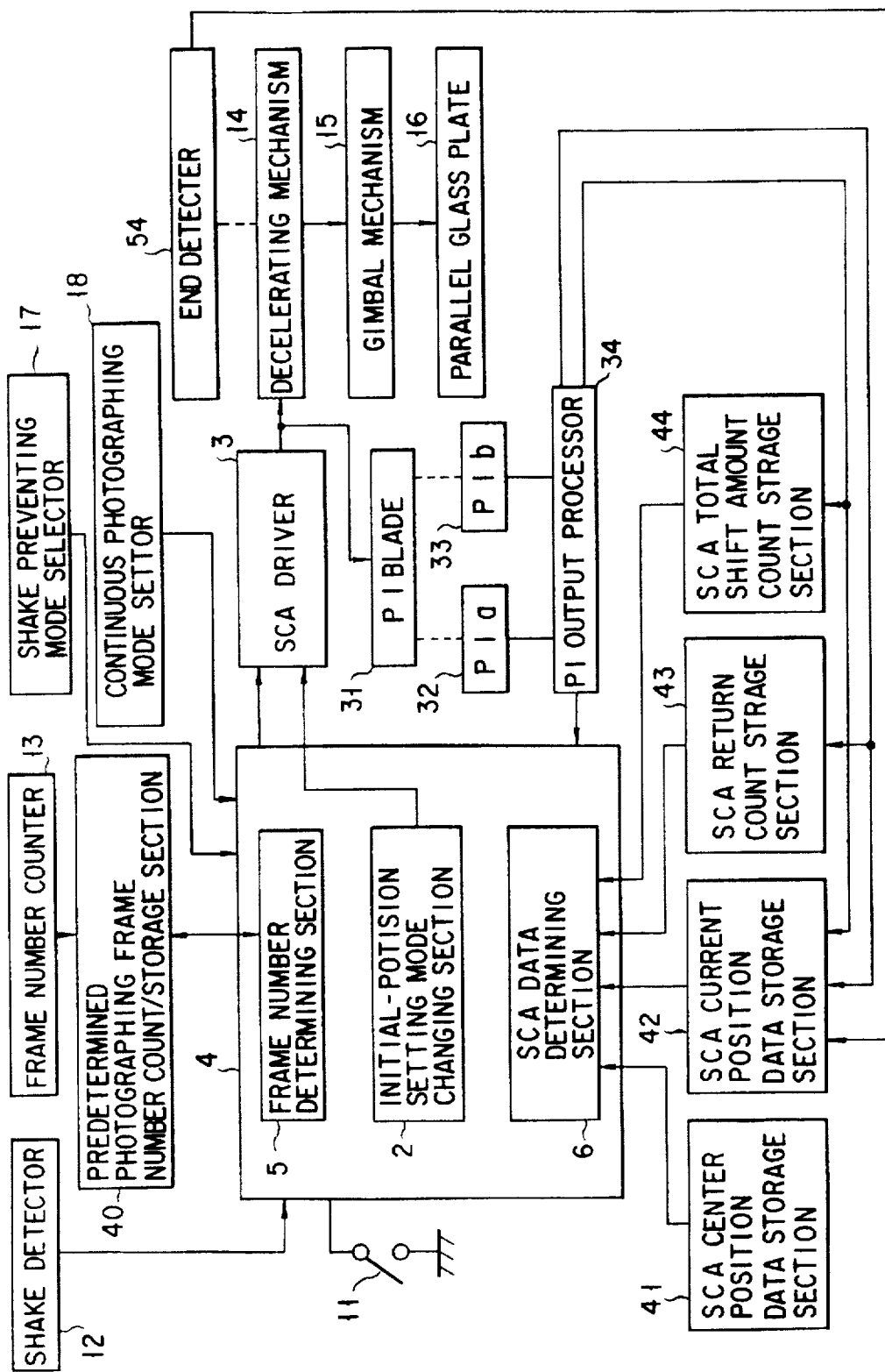
FIG. 3 is a diagram exemplifying the specific structure of the shake correcting apparatus.

FIG. 3 shows the specific structure of the shake correcting apparatus.

Same reference characters are given to the constituting components shown in FIG. 3 which are also shown in FIGS. 1 and 2 to avoid repeating their descriptions.

It is to be noted that the IPS mode changing section 2 is located in the controller 4 in FIG. 3.

When a power switch 11, which is connected to the controller 4, is switched on, the camera is activated.

A frame number counter 13 is connected via a predetermined photographing frame number count/storage section 40 to the frame number determining section 5 in the controller 4. The frame number counter 13 counts the number of pictures taken using the shake correcting apparatus and the storage section 40 stores this count. This count and data on a predetermined photographing frame number are read from the storage section 40 as needed. When the determining section 5 determines that the aforementioned predetermined condition has been reached, the frame number data in the storage section 40 is cleared (initialized).

Connected to the controller 4 is a shake detector 12 which outputs a signal according to the shake state of the camera. This shake signal is sent to the controller 4 to be used as shake correction control data. When a shake preventing mode selector 17 connected to the controller 4 selects the shake preventing mode, the aforementioned shake detection by the shake detector 12 and the shake correcting operation at the time a picture is taken with the activated the shake correcting apparatus is driven are performed. This shake correcting operation will be discussed later. A continuous photographing mode setting section 18, connected to the controller 4, is used in carrying out continuous photographing upon exposure.

When this continuous photographing mode setting section 18 is set to the continuous photographable mode, the aforementioned alteration of the initial-position setting (centering operation) mode by the IPS mode changing section 2 is executed even when the continuous photographing is performed using the shake correcting apparatus in that mode. This will be described later.

The aforementioned SCA driver 3, which may be an actuator, is driven by instructions from the controller 4 and the IPS mode changing section 2. This SCA driver 3 drives a decelerating mechanism 14 to be described later to tilt a gimbal mechanism 15 with respect to the photographic optical axis. As a parallel glass plate 16, which is incorporated in the gimbal mechanism 15, is inclined with respect to the photographic optical axis, an image can be moved on the image-forming surface (film surface).

An end detector 54, which is constituted of, for example, a known photoreflector, is provided to detect from the operational status of the decelerating mechanism 14 if the gimbal mechanism 15 and the parallel glass plate 16 are in the operational range. The result of the detection of the operational ends of the shake correcting apparatus by this end detector 54 is sent to an SCA current position data storage section 42 (to be described later) to be used to grasp the current position of the shake correcting apparatus.

A PI blade 31 is rotated during the transmission of the drive power to the decelerating mechanism 14 from the SCA driver 3. The rotational state of this PI blade 31 is detected by two photointerrupters PIa 32 and PIb 33. The output waveforms from those photointerrupters are processed by a PI output processor 34 to be output as an actual driving (pulse) signal and a directional signal. Those outputs are sent to the controller 4 and also to storage sections 42, 43 and 44 (to be described later) for storing the operational statuses of the shake correcting apparatus.

Connected to the aforementioned SCA data determining section 6 in the controller 4 are storage sections 41, 42, 43 and 44 for storing the operational statuses of the shake correcting apparatus. Those storages will be discussed below.

The SCA center position data storage section 41 stores the center position data from the operational ends of the shake correcting apparatus according to this embodiment. The SCA current position data storage section 42 stores data on the current position of the shake correcting apparatus in its operational range. The actual driving (pulse) signal and directional signal from the PI output processor 34 are input to this storage section 42. Every time those signals are input, the current position data of the shake correcting apparatus is renewed. This current position data is read from the SCA data determining section 6 as needed.

The SCA return count storage section 43 stores data on how many times the returning operation caused by the activation of the shake correcting apparatus has occurred. That is, the directional signal from the PI output processor 34 is input to the storage section 43, it is considered that the returning operation has occurred once as the status of the directional signal is changed, and this data on the number of occurrences is stored in the storage section 43.

The count and memory data in the SCA return count storage section 43 are read from the SCA data determining section 6 as needed. When the SCA data determining section 6 determines that the aforementioned predetermined condition has been reached, the return number data in the storage 43 is cleared (initialized).

The SCA total shift amount count storage section 44 stores data on the total amount of shift caused by the activation of the shake correcting apparatus. The actual driving (pulse) signal from the PI output processor 34 is input to the storage section 44, it is considered that a predetermined amount of shift has occurred as this signal is input, and the count and memory data in this storage section 44 are read from the SCA data determining section 6 as needed. When the SCA data determining section 6 determines that the aforementioned predetermined condition has been reached, the total shift amount data in the storage section 44 is cleared (initialized).

As the specific operation of the above-described structure will be explained later with reference to the flowcharts shown FIGS. 7 through 14, the detailed description will be omitted now. The basic operation is such that the SCA data determining section 6 determines that the aforementioned predetermined condition has been reached, and the initial-position setting mode of the shake correcting apparatus is selected (renewed) in accordance with the result of the determination.

Although the structure shown in FIG. 3 which has been discussed so far is concerned with one axis of the image surface, the shake detection and correction for a camera are normally executed for two (vertical and horizontal) axes of the image surface (film surface). With regard to the other axis, therefore, the same structure as shown in FIG. 3 is also provided with the controller 4 shared by both structures.

Figure 4:
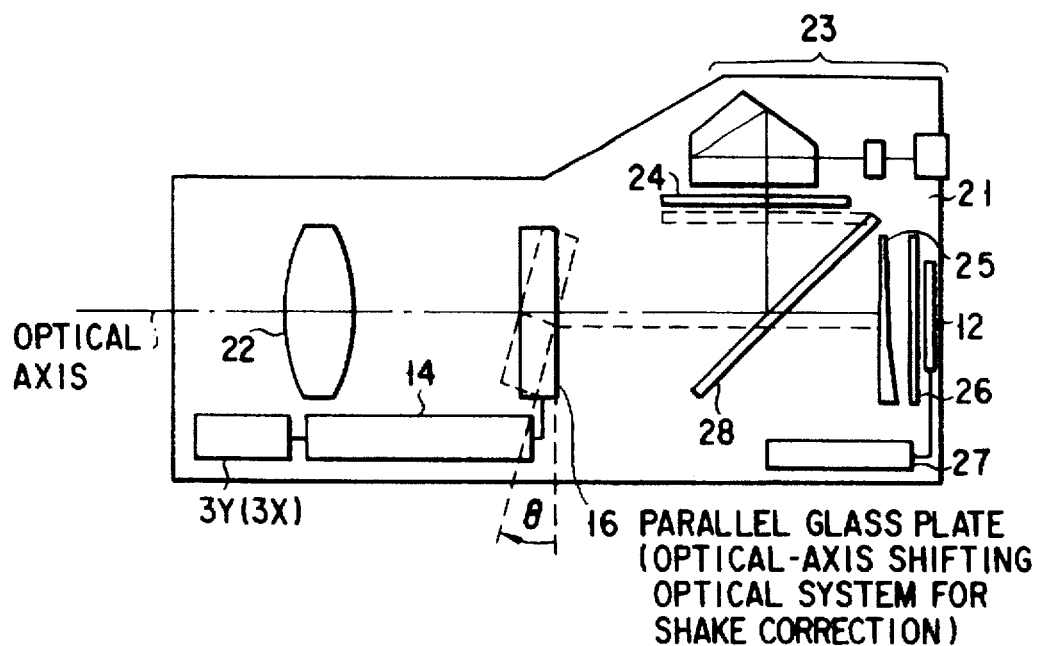
FIG. 4 is a cross-sectional view showing the specific structure of the shake correcting apparatus of this embodiment as adapted for use in a single-lens reflex camera.
Figure 6:
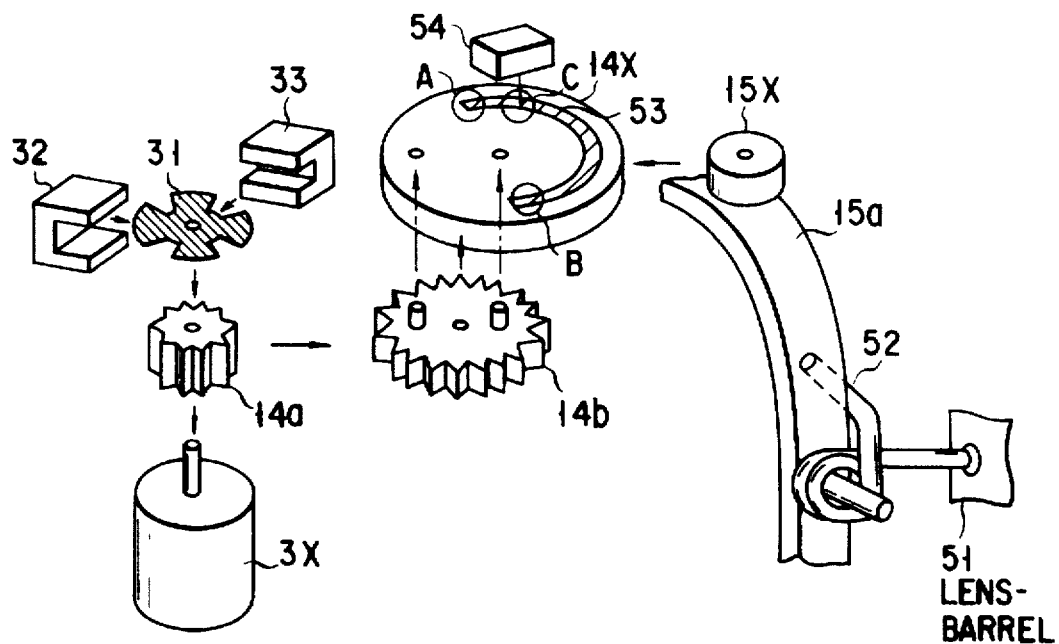
FIG. 6 is a diagram showing the layout relation among parts for detecting the speed and position of the shake correcting apparatus.
Figure 5:
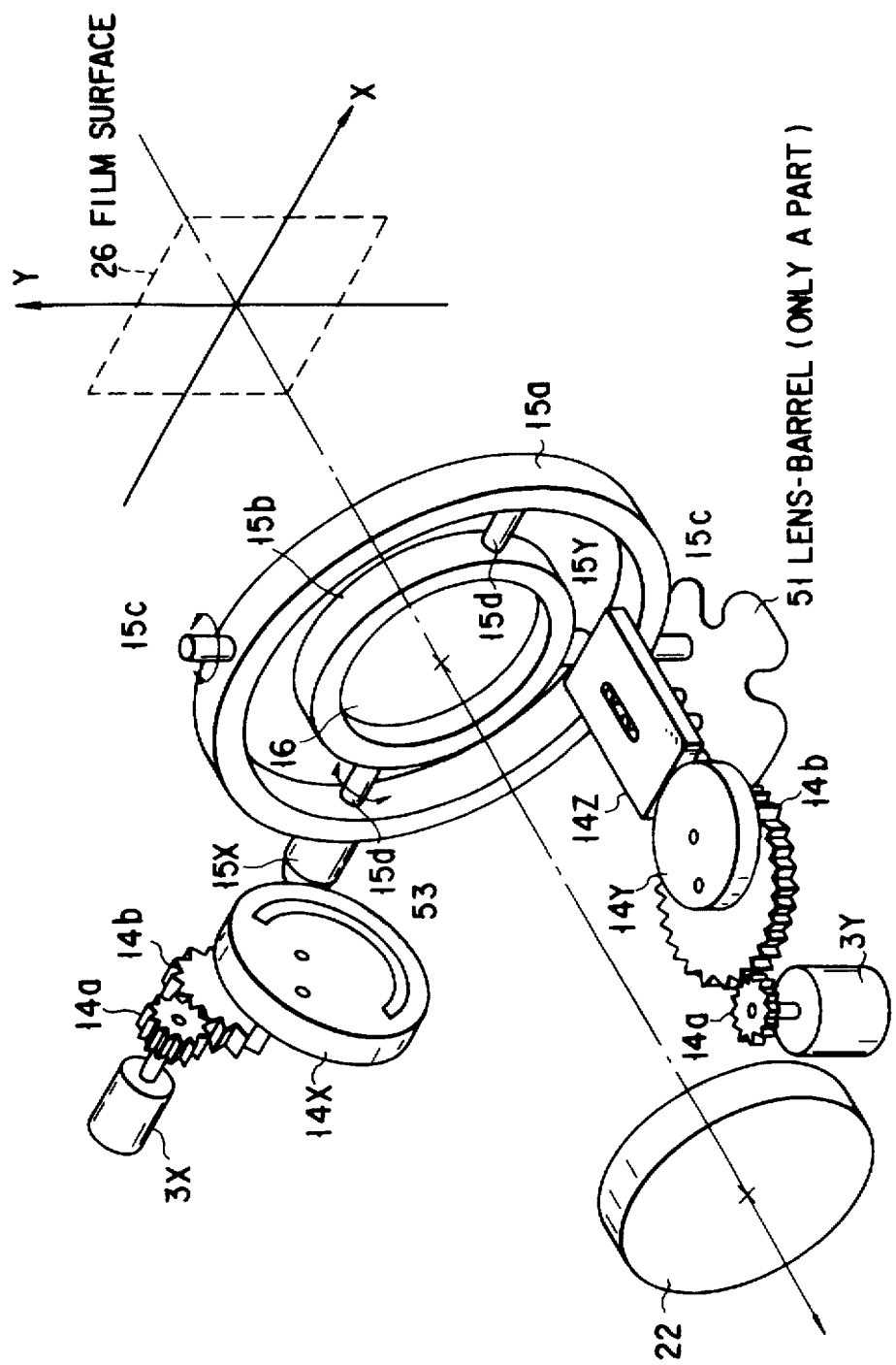
FIG. 5 is a perspective view showing the overall structure of an apparatus for tilting a parallel glass plate shown in FIG. 4.

FIGS. 4 through 6 illustrate the specific structure of the shake correcting apparatus of this embodiment as adapted for use in a single-lens reflex (SLR) camera.

FIG. 4 presents a cross-sectional view of the SLR camera. Provided inside a camera body 21 are the shake detector 12 for detecting hand-oriented shaking at the time of taking a picture, a photographing lens 22 for picking up an image, the parallel glass plate 16 which is inclined to the photographic optical axis to execute shake correction, a quick return mirror 28, a finder optical system 23, a shutter device 25, a film 26, an SCA driver 3Y used to move the image-forming status in the direction of the Y axis of the image surface by tilting the parallel glass plate 16, the decelerating mechanism 14 for transmitting the drive power (rotation), caused by the SCA driver 3Y, to the parallel glass plate 16, and an electronic circuit section 27 such as a CPU which controls the overall camera.

With such a camera in use, with the quick return mirror 28 moved down (solid line), the image of a target passing the photographing lens 22 is reflected upward by 90 degrees at the quick return mirror 28 to be formed on a screen 24. The user can observe the target image through the finder optical system 23. At the time of taking a picture, the quick return mirror 28 is lifted up to the position indicated by the broken line, so that the target image moves directly toward the shutter device 25. As the shutter device 25 runs the shutter screen to lead the target image (light) to the film 26 for exposure. Provided between the photographing lens 22 and the quick return mirror 28 is the parallel glass plate 16 as an optical-axis shifting optical system for shake correction (image shifting section for shake correction) which shifts the optical axis in parallel.

The action of the parallel glass plate 16 will be briefly described below. When the parallel glass plate 16 is inclined by an angle θ to the position indicated by the broken line in FIG. 4 from the position perpendicular to the optical axis, the light is refracted at the front and back surfaces of the parallel glass plate 16 by the same angle in the opposite directions to shift the optical axis in parallel. Using this action, in accordance with the shifting of the image by the shaking of the camera, the image is shifted in the direction to cancel that image movement, thereby compensating for and preventing the shake-oriented image movement and image deterioration.

In FIG. 4, there are two shake detectors 12, one for detecting the shake about the X axis of the image surface and the other associated with the Y axis of the image surface (not shown in FIG. 3). With regard to the SCA driver 3 and the decelerating mechanism 14, the SCA driver 3X for moving the imaging state in the direction of the X axis (not shown in FIG. 4) and the decelerating mechanism 14 associated with the X axis are also provided in the camera body 21. Those shake detectors 12 and SCA drivers 3 are connected to the electronic circuit section 27. The electronic circuit section 27 includes the controller 4, etc. for generating drive signals for the SCA driver 3X and SCA driver 3Y to tilt the parallel glass plate 16 to cancel the shake-oriented image shifting on the image surface, based on the shade data of the camera body 21 detected by the shake detectors 12.

With reference to FIGS. 5 and 6, the aforementioned operation of tilting the parallel glass plate 16 will be explained below. FIG. 5 is a detailed diagram which shows the overall structure of the apparatus for tilting the parallel glass plate 16 and which includes the drive power transmission portion for rotating the parallel glass plate 16 about the Y axis of the image surface (the image shifting in the direction of the X axis on the film surface).

The parallel glass plate 16 is so designed as to be rotatable about the X axis and the Y axis in FIG. 5. In FIG. 5, a gimbal outer frame 15a is attached to a part of a lens-barrel 51 via a gimbal outer frame shaft 15c in such a way as to be rotatable about the Y axis. A gimbal inner frame 15b is rotatably attached via a gimbal inner frame shaft 15d, attached to the inner wall of the gimbal outer frame 15a, in such a way that the parallel glass plate 16 can rotate about the X axis at the upright position of the gimbal outer frame 15a or when the parallel glass plate 16 is parallel to the X axis.

The parallel glass plate 16 is assembled to the gimbal inner frame 15b. Those gimbal outer frame shaft 15c, the gimbal inner frame shaft 15d, the gimbal outer frame 15a and the gimbal inner frame 15b allow the parallel glass plate 16 to freely rotate about two axes, the X axis and the Y axis. Attached to the outer surface of the gimbal outer frame 15a is a gimbal slide receiver 15X for receiving the drive power for rotating the gimbal mechanism 15 about the gimbal outer frame shaft 15c.

This gimbal slide receiver 15X abuts on an eccentric cam 14X. The gimbal slide receiver 15X and the eccentric cam 14X are urged by a pressing pin 52 (which will be discussed later) shown in FIG. 6, which is attached to the gimbal outer frame shaft 15c. Even when the contact position is shifted by the rotation of the eccentric cam 14X, the pressing pin 52 prevents the contact between the gimbal slide receiver 15X and the eccentric cam 14X from being lost. The eccentric cam 14X has a decelerating gear 14b formed integrally. This decelerating gear 14b is to be engaged with a pinion gear 14a securely attached to the SCA driver 3X. With this structure, the rotation of the SCA driver 3X is transmitted to the gimbal outer frame 15a as the rotation about the Y axis via the pinion gear 14a, the decelerating gear 14b, the eccentric cam 14X and the gimbal slide receiver 15X, so that the parallel glass plate 16 is rotatable about the Y axis.

The power transmission system for rotating the parallel glass plate 16 about the X axis is constructed in almost the same way. The rotation of the SCA driver 3Y is transmitted to the pinion gear 14a, the decelerating gear 14b and an eccentric cam 14Y. In addition to the aforementioned mechanism for rotating the parallel glass plate 16 about the Y axis, a cam plate 14Z having a straight cam groove formed therein to restrict the movement only in the direction of the Z axis (optical axis) is placed over two pin-shaped cam plate guides. The eccentric cam 14Y abuts on the cam plate 14Z, so that the rotation of the SCA driver 3Y is transmitted as the movement of the cam plate 14Z. A gimbal slide receiver 15Y attached to the gimbal inner frame 15b abuts on the other end of the cam plate 14Z, so that the rotation of the SCA driver 3Y is transmitted as the rotation about the X axis to the gimbal inner frame 15b. Therefore, the parallel glass plate 16 is rotatable about the X axis.

FIG. 6 is a diagram showing the layout relation among parts for detecting the speed and position of the shake correcting apparatus. In FIG. 6, the pinion gear 14a is securely fitted on the rotary shaft of the SCA driver 3X, and the PI (photointerrupter) blade 31 is also fitted on that rotary shaft. The PI blade 31 is driven (rotated) simultaneously with the aforementioned gimbal outer frame 15a and parallel glass plate 16 at the same time as the SCA driver 3X is rotated. As the PI blade 31 rotates, the slit portion rotates to pass or block the light from two photointerrupters PI(A) 32 and PI(B) 33. In accordance with the passing/blocking of the light, an electric pulse signal is generated.

The ON/OFF period of the blocking of the light by the PI blade 31 and the positional relation between the photointerrupters PI 32 and PI 33 are designed in such a manner that two PI output pulses are shifted by a ¼ period. The two output pulses of the photointerrupters PI 32 and PI 33 are shaped to become sharp pulse signals by a comparator (not shown in FIG. 6). The output of this comparator is sent to a known exclusive-OR (EX-OR) gate and a D flip-flop (neither shown in FIG. 6), and are also sent to the controller 4, the SCA current position data storage section 42, the SCA return count storage section 43 and the SCA total shift amount count storage section 44 (all shown in FIG. 3) as the actual drive pulse signal and the directional signal according to the shifting status of the shake correcting apparatus, so that the current usage status of the shake correcting apparatus can be grasped.

A reflector 53 is arranged on the side surface of the eccentric cam 14X. This reflector 53 is used to determine if the shake correcting apparatus, more specifically, the gimbal mechanism 15 and the parallel glass plate 16, are in a predetermined operational range. This decision is made by checking if the reflector 53 is in a predetermined state by an end detector (photoreflector) 54, i.e., if the shake correcting apparatus is at the end of the operational range. The reflector 53 is located at a predetermined position on the side surface of the eccentric cam 14X in such a way as to accurately detect if the shake correcting apparatus is at the end of the operational range.

While the specific structure and the operation of the shake correcting apparatus have been described with reference to FIGS. 4 through 6, the initial-position setting operation of the shake correcting apparatus is executed by driving the SCA driver 3X and the SCA driver 3Y in such a way that the gimbal mechanism 15 rotates about the X axis and the Y axis and to set the parallel glass plate 16, assembled in the gimbal mechanism 15, nearly the center for both axes. At this time, the outputs of the photointerrupters PIa 32 and PIb 33 and the end detector (photoreflector) 54 are used as data to find out the current position of the shake correcting apparatus.

A method of setting the initial position of the shake correcting apparatus of this embodiment will now be described with reference to the flowcharts shown in FIGS. 7 through 14.

To begin with, the schematic operation of the camera including the shake correcting apparatus will be discussed with reference to the flowchart in FIG. 7.

Figure 7:
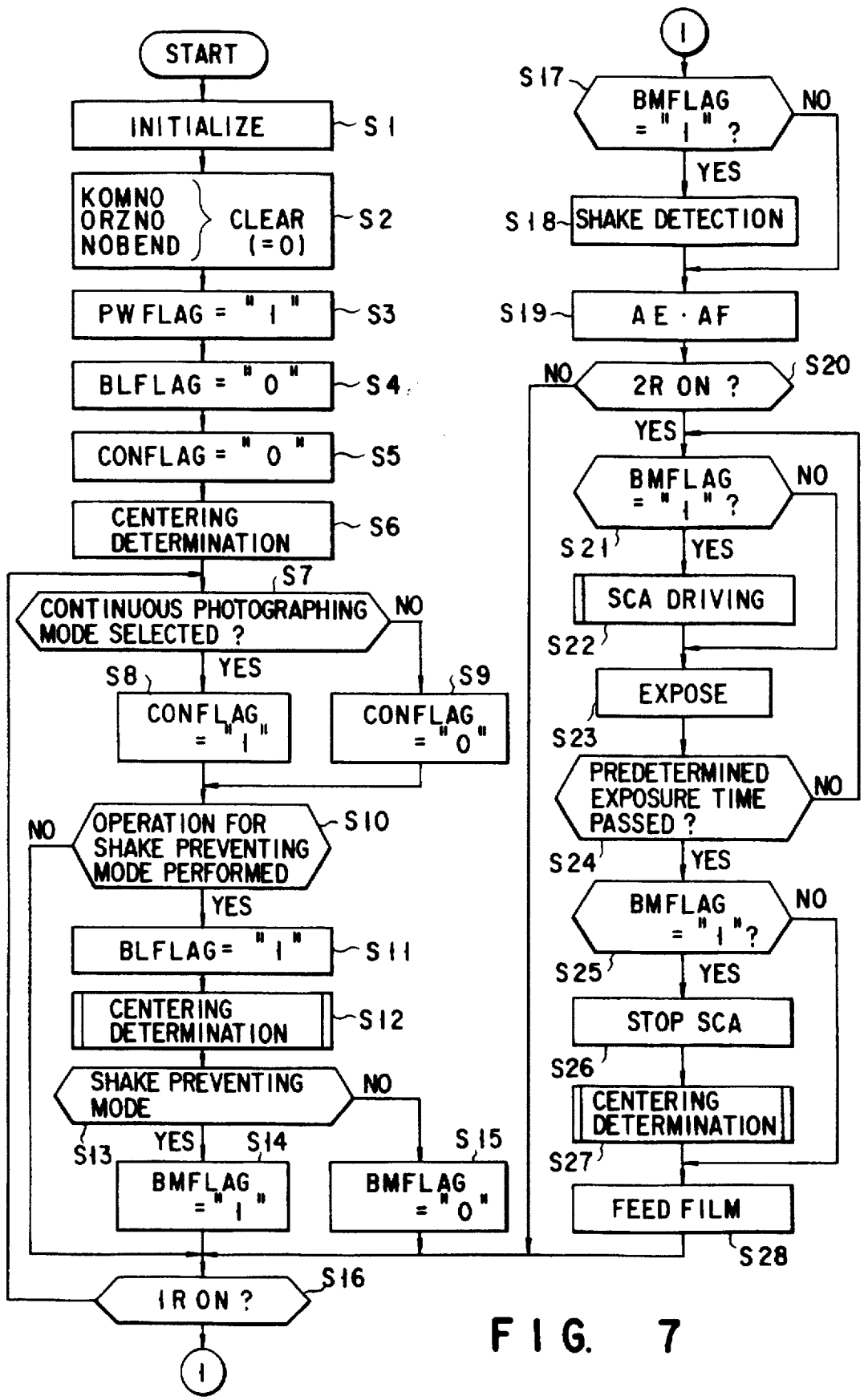
FIG. 7 is a flowchart for explaining the schematic operation of the camera including the shake correcting apparatus.

In FIG. 7, as the power switch 11 in FIG. 3 is set on, the controller 4 is activated to perform initialization (step S1).

Next, the frame number data "KOMNO," the SCA return number data "ORINO" and the SCA total shift amount data "NOBENO" are cleared (initial values=0) (step S2). Then, a flag "PWFLAG" representing the status immediately after the ON action of the power switch 11 is set to "1" (step S3).

Next, a flag "BLFLAG" representing the status immediately after the manipulation of the shake preventing mode selector 17 is set to "0" to indicate that it is not right after the manipulation of the shake preventing mode selector 17 (step S4). The continuous photographing mode setting section 18 is manipulated to set a flag "CONFLAG" indicating if the photographing mode is the continuous photographing mode to "0" to indicate that the photographing mode is not the continuous photographing mode (step S5).

Then, a subroutine "Centering" for determining the initial-position setting mode of the shake correcting apparatus (hereinafter called "centering operation") and performing the actual centering operation is executed (step S6). This subroutine will be discussed later with reference to FIG. 8.

It is then determined if the continuous photographing mode is selected as the photographing mode by the manipulation of the continuous photographing mode setting section 18 shown in FIG. 3 (step S7). When the continuous photographing mode is selected (YES), the flag "CONFLAG" indicating if the photographing mode is the continuous photographing mode is set to "1" to indicate that the photographing mode is the continuous photographing mode (step S8). When the continuous photographing mode is not selected, on the other hand, this flag "CONFLAG" is set to "0" to indicate that the photographing mode is not the continuous photographing mode (step S9).

After the setting of the flag CONFLAG, it is determined if the shake preventing mode selector 17 shown in FIG. 3 is manipulated (step S10). In this step, the case where the shake preventing mode is set and the case where the shake preventing mode is released are detected and determined.

When the shake preventing mode selector 17 is not manipulated (NO), the flow proceeds to step S16 which will be discussed later. When the shake preventing mode selector 17 is manipulated (YES), however, the flag "BLFLAG" representing the status immediately after the manipulation of the shake preventing mode selector 17 is set to "1" to indicate that it is right after the manipulation of the shake preventing mode selector 17 (step S11).

Then, as in the aforementioned step S6, the subroutine "Centering" for determining the initial-position setting mode of the shake correcting apparatus and performing the actual centering operation is executed (step S12). This subroutine will be discussed later with reference to FIG. 8.

It is then determined whether the photographing mode of the camera selected in the step S10 is the shake preventing mode (step S13). When the shake preventing mode is selected (YES) in step S10, a flag "BMFLAG" about the shake preventing mode is set to "1" to indicate that the mode is the shake preventing mode (step S14). When the shake preventing mode is released (NO), the flag "BMFLAG" is set to "0" to indicate that the mode is not the shake preventing mode (step S15).

Then, it is determined if the first release manipulator (not shown) of the camera is manipulated (step S16). When the first release manipulator is not operated (NO), the flow returns to step S7. When the first release manipulator is operated (YES), the status of the flag "BMFLAG" indicating whether or not the mode is the shake preventing mode is checked (step S17).

When "BMFLAG"="1" in this decision or in the shake preventing mode (YES), the detection of the shaking of the camera by the shake detector 12 shown in FIG. 3 and the arithmetic operation by the controller 4 for grasping the shaking state start (step S18). The shake detection and the arithmetic operation continues while the flag "BMFLAG" about the shake preventing mode is "1".

When "BMFLAG"="0" in the step S17, i.e., when the mode is not the shake preventing mode (NO), or after the process of step S18, automatic exposure (AE) and automatic focusing (AF) are executed (step S19). As a result, the exposure time and the aperture value are determined and the focusing lens is moved out or in.

Then, it is determined if the second release manipulator (not shown) of the camera is manipulated (step S20). When the second release manipulator is not operated i.e., the exposure start instruction is not made (NO), the flow returns to step S16. When the second release manipulator is operated (YES), however, the operational control of the quick return mirror 24 and the shutter device 25 shown in FIG. 3 is initiated and the status of the flag "BMFLAG" indicating whether or not the mode is the shake preventing mode is checked as in the step S17 (step S21).

When "BMFLAG"="1" in this decision or in the shake preventing mode (YES), the driving of the shake correcting apparatus described above starts based on the results of the shade detection and the arithmetic operation performed in the step S18 (step S22). Accordingly, the shake correcting operation during exposure is executed. The driving mode of the shake correcting apparatus here will be described later with reference to FIG. 14.

When "BMFLAG"="0" in the step S21, i.e., when the mode is not the shake preventing mode (NO), or after the process of step S22, the exposure operation of the camera is performed (step S23).

It is then determined if a predetermined exposure time determined by the result of the automatic exposure performed in the step S19 has passed (step S24). When the predetermined exposure time has not passed (NO), the flow returns to step S21, but when the predetermined exposure time has passed (YES), the status of "BMFLAG" indicating if the mode is the shake preventing mode is checked as in the aforementioned steps S17 and S21 (step S25).

When "BMFLAG"="1" in this decision, i.e., in the shake preventing mode (YES), which means that the passage of the predetermined exposure time is determined in the step S24, the operation of the shake correcting apparatus in shake preventing mode is stopped (step S26). Then, as in the aforementioned steps S6 and S12, the subroutine "Centering" for determining the initial-position setting mode of the shake correcting apparatus and performing the actual centering operation is executed (step S27). This subroutine will be discussed later with reference to FIG. 8.

After the execution of the centering operation or "BMFLAG"="0", i.e., the mode is not the shake preventing mode (NO) in the step S25, the film advancement is performed (step S28). After the film advancement is completed, the flow returns to the step S16 to repeat the sequence of processes discussed above.

With reference to the flowchart in FIG. 8, the subroutine "Centering Determination" which is executed in steps S6, S12 and S27 in FIG. 7 will be described below.

First, the status of the flag "PWFLAG" which indicates the status immediately after the ON action of the power switch 11 in FIG. 3 and is set in step S2 in FIG. 7 is checked (step S31). When "PWFLAG"="1" (YES) in this check, the flag "PWFLAG" is changed to "0" (step S32) after which the flow moves to step S39 to execute a predetermined centering operation.

The flag "PWFLAG"="1" means that it is right after the power switch 11 is set on. The reason why "PWFLAG" is set to "0" in the step S32 is that the centering operation is performed once immediately after the ON action of the power switch 11 after which there is not basically the state "immediately after the ON action of the power switch" so that at the time the subroutine "Centering" in FIG. 8 is performed, the centering operation is prevented from being executed at least under the condition "immediately after the ON action of the power switch."

When "PWFLAG" is not "1" or "PWFLAG"="0" (NO) in the step S31, which means that it is not immediately after the ON action of the power switch, the flag "BLFLAG" representing the operational status of the shake preventing mode selector 17 in FIG. 3 set in the step S4 or S11 in FIG. 7 is checked (step S33). The flag "BLFLAG"="1" means that it is the right after the manipulation of the shake preventing mode selector 17.

When "BLFLAG"="1" (YES) in this check, the flag "BLFLAG" is changed to "0" (step S34) after which the flow moves to step S39 to execute the predetermined centering operation.

Figure 8:
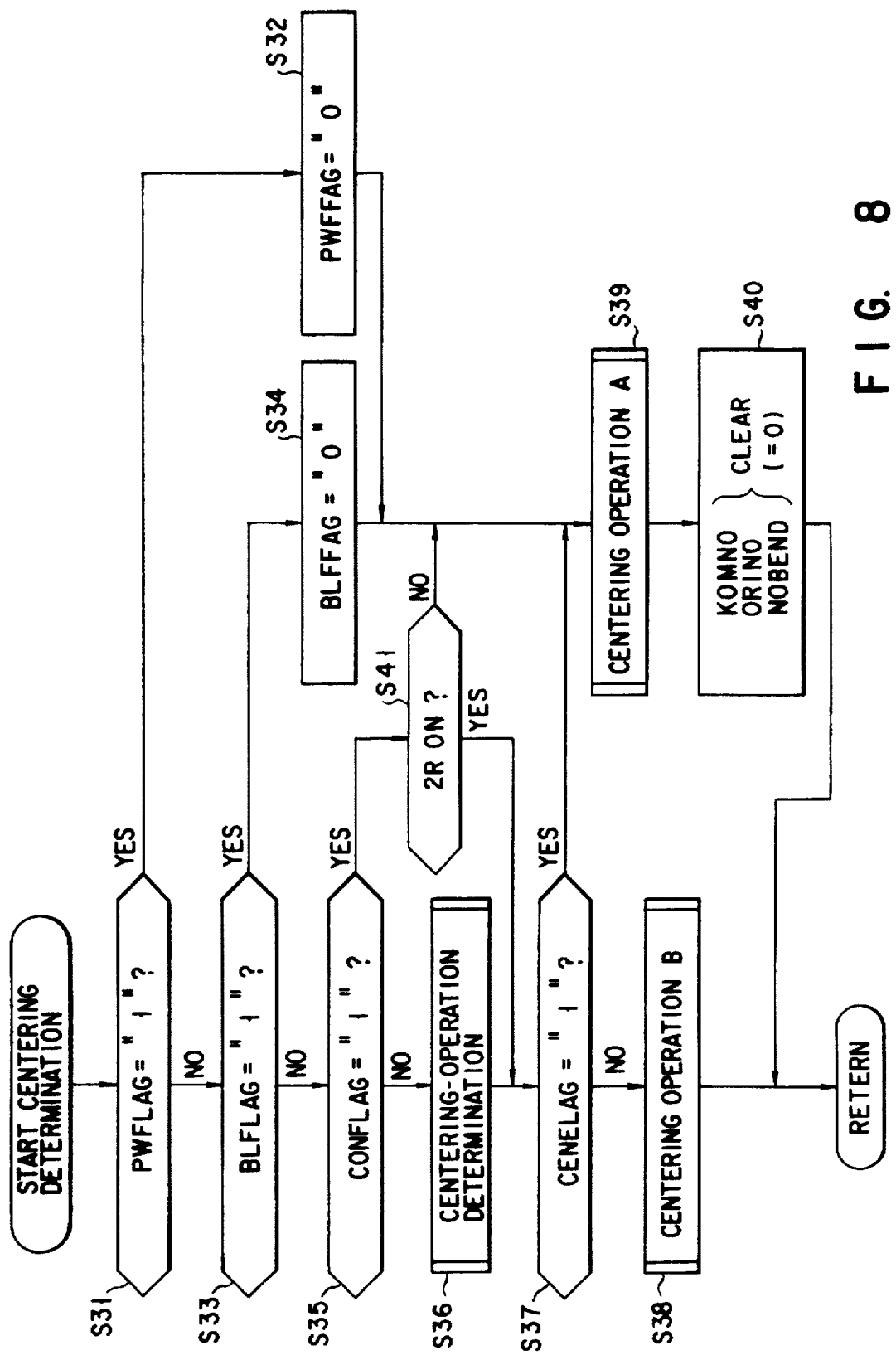
FIG. 8 is a flowchart for explaining a subroutine "Centering Determination" shown in FIG. 7.

The reason why "BLFLAG" is set to "0" in the step S34 is that the centering operation is performed once immediately after the manipulation of the shake preventing mode selector 17 after which there is not basically the state "the selection of the shake preventing mode" unless the selector 17 is manipulated again, so that at the time the subroutine "Centering" in FIG. 8 is performed, the centering operation is prevented from being executed at least under the condition "shake preventing mode" unless the operation for selecting the shake preventing mode is performed.

When "BLFLAG" is not "1" or "BLFLAG"="0" (NO) in the step S33, which means that it is not immediately after the manipulation of the shake preventing mode selector 17, the status of the flag "CONFLAG" set in step S8 or S9 in FIG. 7 indicating if the photographing mode is the continuous photographing mode is checked (step S35). When the flag "CONFLAG"="1" (YES) in this determination, it is checked if the second release manipulator of the camera is operated (step S41). This step S41 will be discussed later.

When "CONFLAG" is not "1" (NO) or the flag "CONFLAG"="0" in the step S35, which means that the photographing mode is not the continuous photographing mode, the subroutine "Centering Operation Determination" for determining the operational method for the shake correcting apparatus is executed before the centering operation of the shake correcting apparatus is actually performed (step S36). The specific contents of this subroutine will be discussed later with reference to FIGS. 9 through 11.

After this subroutine is executed, the status of a flag "CENFLAG" for determining the centering operation is checked (step S37). When "CENFLAG" is not "1" or "CENFLAG"="0" (NO) in this check, a subroutine for performing a pattern B of the centering operation is executed (step S38).

The pattern B of the centering operation is a quick, low power consumption centering operation mode as compared to a pattern A of the centering operation to be described later. This pattern B is basically performed when the frame number and the usage status of the shake correcting apparatus do not meet predetermined usage conditions. This subroutine will be discussed later with reference to FIG. 13. After the execution of this subroutine, the flow returns to step S7, or step S13 or step S28.

When "CENFLAG"="1" (YES) in the step S37 or after the execution of the step S32 or step S34, the pattern A of the centering operation is executed (step S39).

The pattern A of the centering operation is the longer operating time centering operation pattern B of the centering operation. This pattern A is basically performed when the frame number and the usage status of the shake correcting apparatus meet predetermined usage conditions, and when it is predicted that the multiplication error of the current position data of the shake correcting apparatus is increased as in the case of immediately after the ON action of the power switch 11, immediately after the manipulation of the shake preventing mode selector 17 or immediately after the continuous photographing involving the shake correction is completed. This subroutine will be discussed later with reference to FIG. 12.

After the pattern A of the centering operation is executed, data such as "KOMNO" (frame number data), "ORINO" (SCA return number data) and "NOBENO" (SCA total shift amount data) based on which the decision in step S36 is made are cleared (=0) (step S40). Those data "KOMNO," "ORINO," "NOBENO," etc. will be discussed later with reference to FIGS. 9 through 11. After the execution of this subroutine, the flow returns to step S7, step S13 or step S28 shown in FIG. 7.

When it is determined in the step S35 that "CONFLAG"="1" indicating that the photographing mode is the continuous photographing mode (YES), the flow advances to step S41 to check if the second release manipulator of the camera is operated.

If the photographing mode is set to the continuous photographing mode as apparent from the decision in the step S35 and the second release manipulator of the camera is manipulated (YES) in the step S41, the continuous photographing is considered to be currently in progress (continue). In this case, the flow proceeds to the aforementioned step S38 to execute the pattern B of the centering operation. This approach can shorten the time needed for the centering operation of the shake correcting apparatus so that continuous photographing is possible while securing the rapid photographing performance.

If the photographing mode is the continuous photographing mode and the second release manipulator of the camera is not manipulated (NO), on the other hand, it is considered that the state is immediately after the completion of the continuous photographing. In this case, the flow proceeds to the aforementioned step S39 to execute the pattern A of the centering operation. As a result, the centering operation is performed in such a way as to cancel the multiplication error of the current position data of the shake correcting apparatus so that the subsequent shake correcting operation will be performed with a less error.

Figure 9:
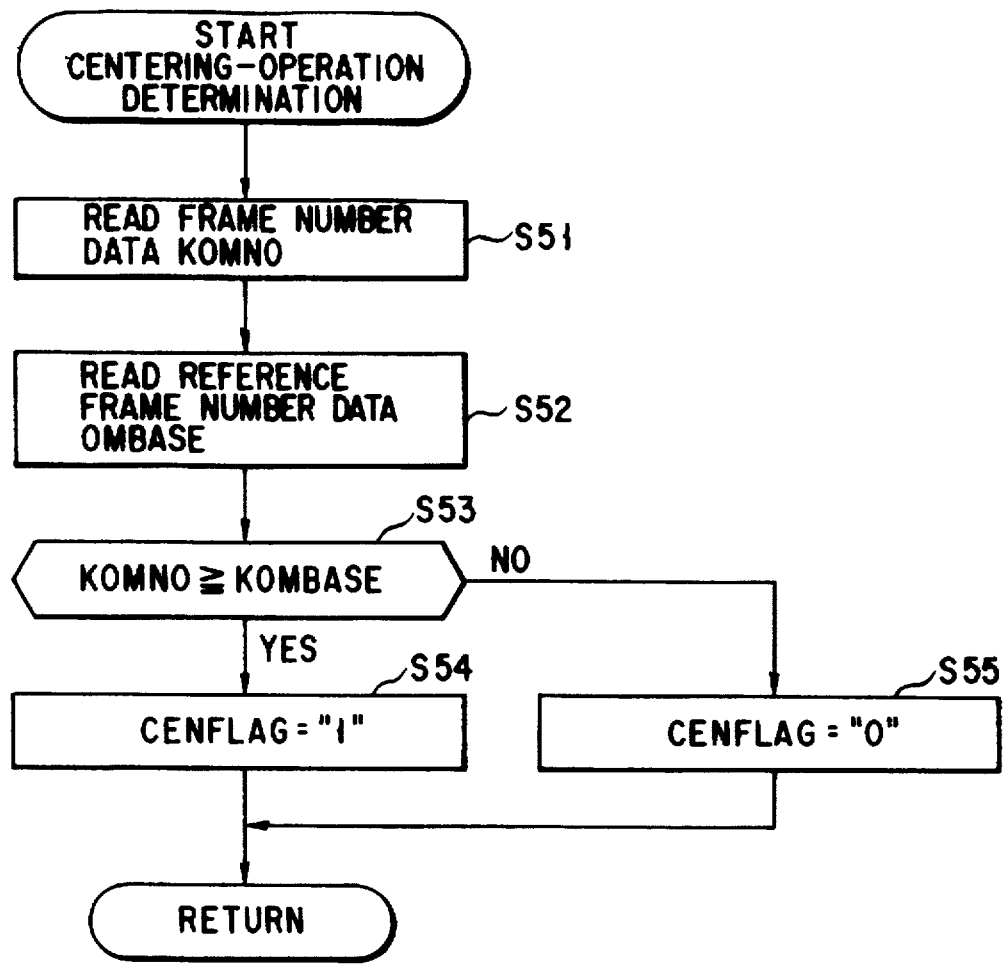
FIG. 9 is a flowchart for explaining the subroutine "Centering-Operation Determination" shown in FIGS. 3 and 8.

With reference to FIG. 9, the subroutine "Centering Operation Determination" in step S36 in FIG. 8 will be described below.

First, the frame number data "KOMNO" is read from the frame number counter 13 (step S51). Then, the reference frame number data (constant) "KOMBASE" is read out (step S52).

The value of the read "KOMNO" is compared with the value of the read "KOMBASE" (step S53). When it is determined that KOMNO≧KOMBASE (YES), i.e., when the number of frames while the shake correcting apparatus is used is equal to or greater than a predetermined frame number, the flag "CENFLAG" used to determine the centering operation mode as in step S37 shown in FIG. 8 is set to "1" (step S54) after which the flow returns to the main routine. As a result, the pattern A of the centering operation is executed in step S39 shown in FIG. 8 to clear the multiplication error of the current position data of the shake correcting apparatus.

When it is determined in the step S53 that KOMNO<KOMBASE (NO), i.e., when the number of frames while the shake correcting apparatus is used is determined to be less than the predetermined frame number, the flag "CENFLAG" used to determine the centering operation mode as in step S37 shown in FIG. 8 is set to "0" (step S55) after which the flow returns to the main routine. As a result, the pattern B of the centering operation which needs a shorter time is executed in step S38 shown in FIG. 8.

As described above, this subroutine outputs data on the determination of the centering operation mode of the shake correcting apparatus based on the frame number data indicating the number of frames used while the shake correcting apparatus is in use.

Figure 10:
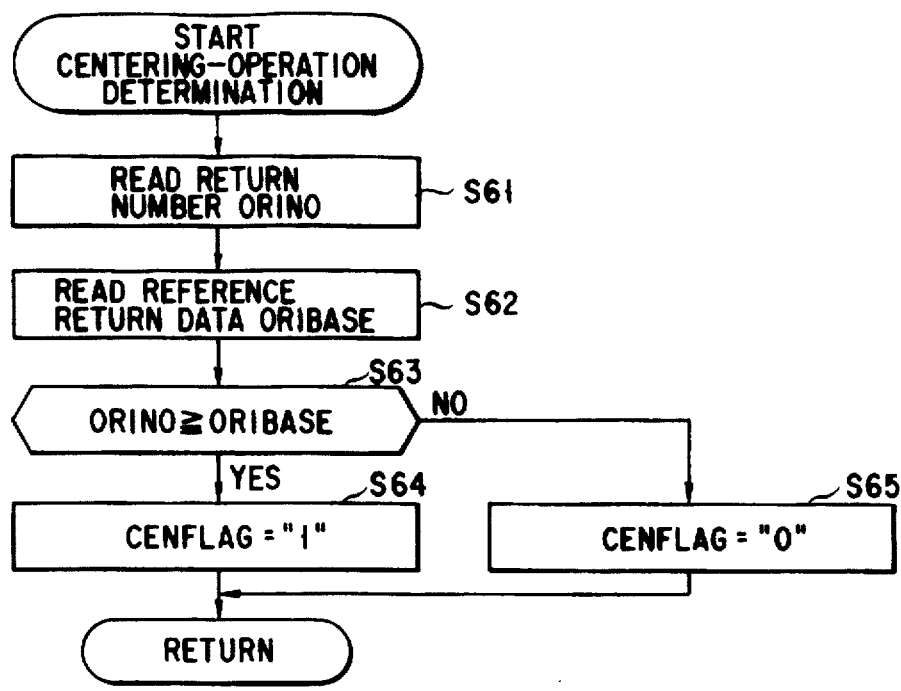
FIG. 10 is a flowchart for explaining a subroutine different from the subroutine "Centering-Operation Determination" shown in FIG. 9.

With reference to FIG. 10, the subroutine "Centering Operation Determination" in step S36 in FIG. 8 will now be described.

First, the return count data "ORINO" of the shake correcting apparatus is read from the SCA return count storage section 43 (step S61). Then, the reference return number data "ORIBASE" (constant) of the shake correcting apparatus is read out (step S62).

The value of the read "ORINO" is compared with the value of the read "ONIBASE" (step S63). When it is determined that ORINO≧ORIBASE (YES), i.e., when the number of returns when the shake correcting apparatus is used is equal to or greater than a predetermined value, the flag "CENFLAG" used to determine the centering operation mode as in the flowchart in FIG. 8 is set to "1" (step S64) after which the flow returns to the main routine. As a result, the pattern A of the centering operation is executed in step S39 shown in FIG. 8 to clear the multiplication error of the current position data of the shake correcting apparatus.

When it is determined in the step S63 that ORINO<ORIBASE (NO), i.e., when the number of returns when the shake correcting apparatus is used is determined to be less than the predetermined value, the flag "CENFLAG" used to determine the centering operation mode as in step S37 shown in FIG. 8 is set to "0" (step S65) after which the flow returns to the main routine. As a result, the pattern B of the centering operation which needs a shorter time is executed in step S38 shown in FIG. 8.

As described above, this subroutine outputs data on the determination of the centering operation mode of the shake correcting apparatus based on the number of returns when the shake correcting apparatus is in use.

Figure 11:
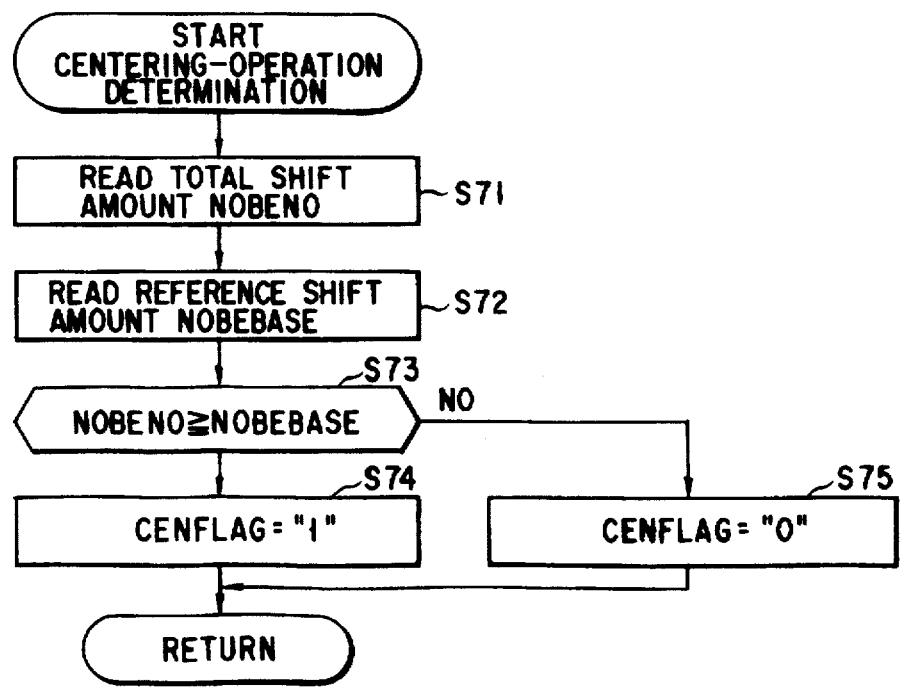
FIG. 11 is a flowchart for explaining a subroutine different from the subroutines "Centering-Operation Determination" shown in FIGS. 9 and 10.

With reference to FIG. 11, an example of a subroutine different from the subroutine "Centering Operation Determination" in step S36 in FIG. 8 and the subroutine in FIG. 10 will now be described.

First, the total shift amount data "NOBENO" of the shake correcting apparatus is read from the SCA total shift amount count storage section 44 (step S71). Then, the reference total shift amount data "NOBEBASE" (constant) of the shake correcting apparatus is read out (step S72).

The value of the read "NOBENO" is compared with the value of the read "NOBEBASE" (step S73). When it is determined that NOBENO≧NOBEBASE (YES), i.e., when the total shift amount when the shake correcting apparatus is used is equal to or greater than a predetermined amount, the flag "CENFLAG" used to determine the centering operation mode as in step S35 shown in FIG. 8 is set to "1" (step S74) after which the flow returns to the main routine. As a result, the pattern A of the centering operation is executed in step S39 shown in FIG. 8 to clear the multiplication error of the current position data of the shake correcting apparatus.

When it is determined in the step S73 that NOBENO<NOBEBASE (NO), i.e., when the total shift amount when the shake correcting apparatus is used is determined to be less than the predetermined amount, the flag "CENFLAG" used to determine the centering operation mode as in step S37 shown in FIG. 8 is set to "0" (step S75) after which the flow returns to the main routine. As a result, the pattern B of the centering operation which needs a shorter time is executed in step S38 shown in FIG. 8.

As described above, this subroutine outputs data on the determination of the centering operation mode of the shake correcting apparatus based on the total shift amount when the shake correcting apparatus is in use.

While the foregoing description given with reference to FIGS. 9 through 11 has discussed the outputting of the data on the determination of the three centering operation modes of the shake correcting apparatus, the centering operation mode may be determined based on only one of the three modes or based on the combination of two or three modes.

Figure 12:
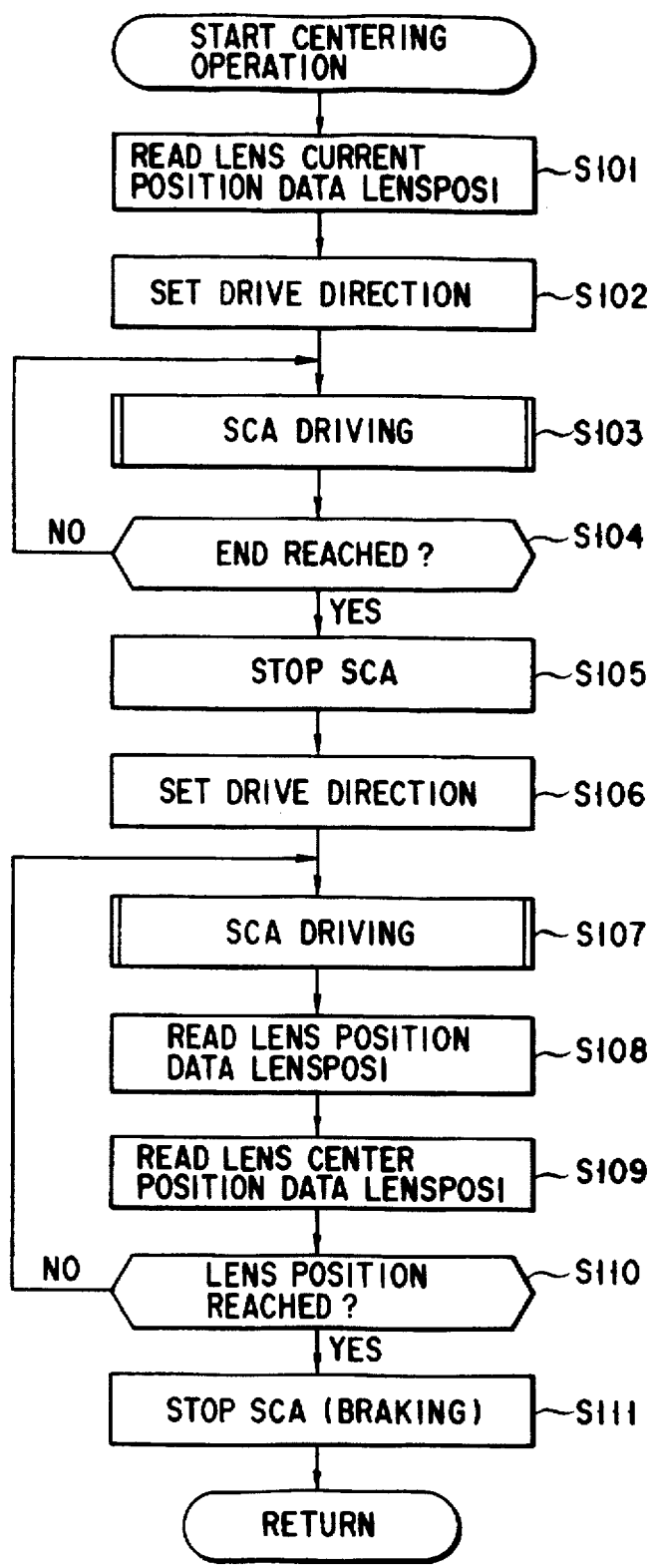
FIG. 12 is a flowchart for explaining a subroutine for a pattern A of the centering operation shown in FIG. 8.

With reference to the flowchart in FIG. 12, the subroutine for the pattern A of the centering operation in step S39 in FIG. 8 will be described.

First, the current position data "LENSPOSI" of the shake correcting apparatus is read from the SCA current position data storage section 42 shown in FIG. 3 (step S101). It is then determined from the read current position data "LENSPOSI" which one of the two ends of the shake correcting apparatus should be reached and the direction of driving the shake correcting apparatus next time is determined from the result of the determination (step S102).

The current position data "LENSPOSI" of the shake correcting apparatus is data corresponding to the portion where the eccentric cam 14X and the gimbal slide receiver 15X shown in FIG. 6. As described above, the movable range of the shake correcting apparatus is the area where the reflector 53 located on the side surface of the eccentric cam 14X is attached, and "A" and "B" in FIG. 6 are the operational ends of the shake correcting apparatus. Assuming that the positional relationship between the reflector 53 on the eccentric cam 14X and the end detector 54 is as illustrated in FIG. 6 ("C"), the distance between the position "C" and the operational end "A" of the shake correcting apparatus is apparently shorter than the distance between the position "C" and the operational end "B."

In such a case, the positional relationship between the reflector 53 on the eccentric cam 14X and the end detector 54 should be changed in such a way that the gimbal slide receiver 15X is rotated clockwise to come to the position "A." Therefore, the driving direction of the shake correcting apparatus, more specifically, the rotational direction of the SCA driver 3 is so set that the shake correcting apparatus reaches the closer one of the two operational ends from the current position of the shake correcting apparatus.

Then, the shake correcting apparatus is driven based on the driving direction of the shake correcting apparatus set in this step S102 (step S103). The driving of the shake correcting apparatus will be discussed with reference to FIG. 14.

It is then determined if the driven shake correcting apparatus has reached the aforementioned end ("A" or "B") (step S104). This decision is made from the output of the end detector 54, as described earlier. When the shake correcting apparatus has not reached the end (NO), the flow returns to the step S103 to repeat the above-described sequence of processes to drive the shake correcting apparatus until it reaches that end. When the shake correcting apparatus has reached the end (YES), on the other hand, the driving of the shake correcting apparatus is stopped (step S105).

Next, the driving direction of the shake correcting apparatus is set again (step S106). This is done because the shake correcting apparatus at the point of the step S104 is at the end of the operational range so that it is necessary to move the shake correcting apparatus to the center of the operational range. In this respect, the opposite driving direction of the shake correcting apparatus to the one set in the step S102 is set.

Then, the shake correcting apparatus is driven to move to the center of the operational range for the shake correction (step S107). The shake correcting apparatus is driven in the set driving direction. The actual driving of the shake correcting apparatus will be described later with reference to FIG. 14.

The current position data "LENSPOSI" of the shake correcting apparatus is read from the SCA current position data storage section 42 shown in FIG. 3 as in the step S101 (step S108). The operational center position data "LENSCEN" of the shake correcting apparatus is read from the SCA center position data storage section 41 shown in FIG. 3 (step S109).

It is determined from the read current position data and operational center position data of the shake correcting apparatus if the shake correcting apparatus has reached a predetermined position immediately before the center position of the operational range (step S110). When the shake correcting apparatus has not reached the predetermined position yet (NO) in this determination, the flow returns to the step S107 to repeat the sequence of processes until the shake correcting apparatus reaches that predetermined position. When the shake correcting apparatus has reached the predetermined position before the center position of the operational range (YES), the shake correcting apparatus is stopped (step S111).

The reason why the decision in the step S110 is made based on the predetermined position before the center position of the operational range of the shake correcting apparatus, not based on the center position itself is that even if a brake command is sent to the SCA driver 3 for driving the shake correcting apparatus in the next step S111, the shake correcting apparatus does not stop upon the reception but moves slightly due to the inertia.

As described above, the pattern A of the centering operation is executed to move the shake correcting apparatus to one end of the operational range once and then move the shake correcting apparatus to the center position. As a result, the centering operation is performed in such a way as to clear the multiplication error of the position data pulse of the shake correcting apparatus. It is therefore possible to execute shake correction with a less error in the subsequent shake correcting operation.

Figure 13:
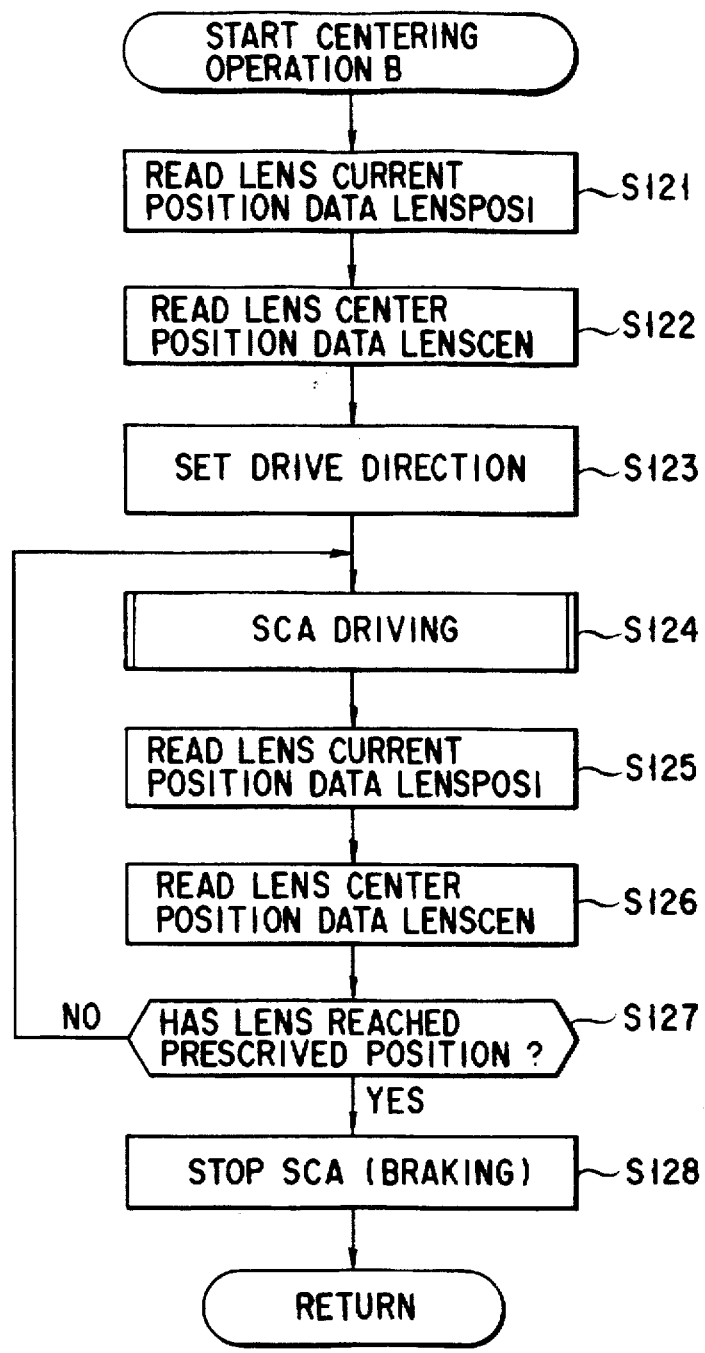
FIG. 13 is a flowchart for explaining a subroutine for a pattern B of the centering operation shown in FIG. 8.

The subroutine of the pattern B of the centering operation in step S38 shown in FIG. 8 will be described below with reference to FIG. 13.

The current position data "LENSPOSI" of the shake correcting apparatus is read from the SCA current position data storage section 42 shown in FIG. 3 (step S121). The operational center position data "LENSCEN" of the shake correcting apparatus is read from the SCA center position data storage section 41 shown in FIG. 3 (step S122). Based on the read current position data "LENSPOSI" and operational center position data "LENSCEN", the driving direction of the shake correcting apparatus, more specifically, the rotational direction of the shake correcting apparatus is set so as to move the shake correcting apparatus to the center position of the operational range (step S123).

Then, the shake correcting apparatus is driven to move to the center of the operational range for the shake correction in the set driving direction (step S124). The driving of the shake correcting apparatus will be described later with reference to FIG. 14. The current position data "LENSPOSI" of the shake correcting apparatus is read from the SCA current position data storage section 42 shown in FIG. 3 as in the step S121 (step S125).

The operational center position data "LENSCEN" of the shake correcting apparatus is read from the SCA center position data storage section 41 in FIG. 3 as in step S122 (step S126). From the read current position data and operational center position data of the shake correcting apparatus, it is determined if the shake correcting apparatus has reached the predetermined position before the center of the operational range (step S127). When the shake correcting apparatus has reached that predetermined position (YES), the shake correcting apparatus is stopped (step S128). When the shake correcting apparatus has not reached that predetermined position yet (NO), the flow returns to step S124 to repeat the above-described sequence of processes until this predetermined position is reached.

The reason why the decision in this step is made based on the predetermined position before the center position of the operational range of the shake correcting apparatus, not based on the center position itself is that even if a brake command is sent to the SCA driver 3 for driving the shake correcting apparatus in the next step S128 at the time of stopping the shake correcting apparatus, the shake correcting apparatus does not stop upon the reception but moves slightly due to the inertia.

As described above, the pattern B of the centering operation is executed to move the shake correcting apparatus directly to center position of the operational range from the current position. As a result, the centering operation is performed in a shorter time, so that photographing involving the shake correction can be performed while securing the rapid photographing performance.

Figure 14:
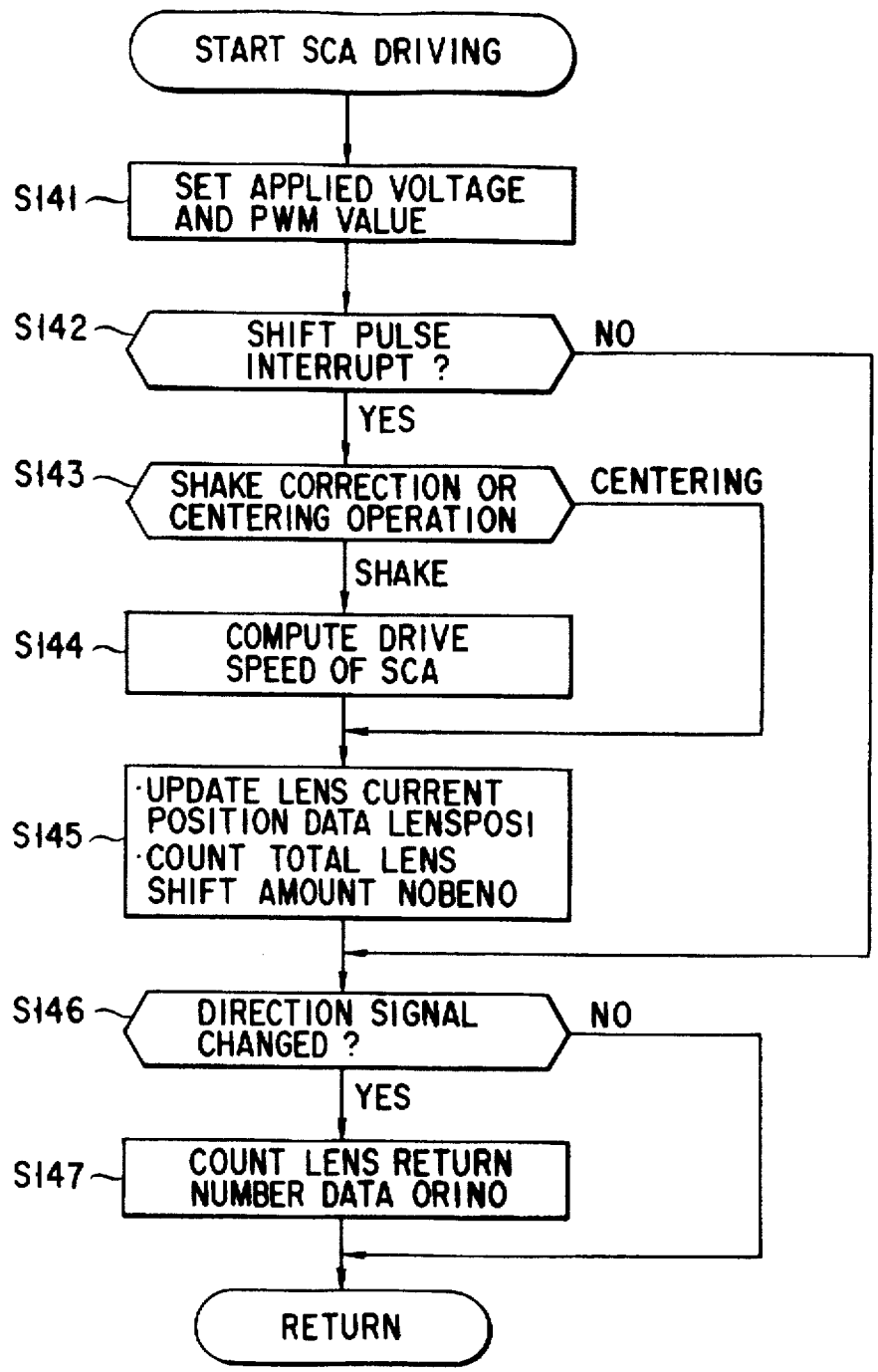
FIG. 14 is a flowchart for explaining a subroutine "SCA Driving" shown in FIGS. 7, 12 and 13.

The subroutine for driving the shake correcting apparatus in step S22 in FIG. 7, steps S103 and S107 in FIG. 12 and step S124 in FIG. 13 will be described below with reference to FIG. 14.

In driving the shake correcting apparatus by means of the SCA driver 3, the applied voltage to the driver 3 and the PWM value (time data) to the driver 3 are set (step S141). At the actual shake correcting operation or in step S22 in FIG. 7, the applied voltage and PWM value are variably set to accurately correct the shaking based on the results of the shake detection and the arithmetic operation done in step S18 in FIG. 7 and the current driving status of the shake correcting apparatus. Otherwise, it is the centering operation of the shake correcting apparatus, so that predetermined voltage and PWM value are set.

Then, it is determined if the actual drive pulse signal is input (interruption) to the controller 4 in FIG. 3 (step S142). When there is no input of the drive pulse signal (NO) in this determination, the flow advances to step S146 to be described later. When there is an input of the drive pulse signal (YES), it is determined whether the flow enters this subroutine "SCA Driving" due to the shake correcting operation or due to the centering operation (step S143).

If the flow enters this subroutine due to the shake correcting operation, the driving speed of the shake correcting apparatus is computed from the pulse data input in step S142 or the input pulse interval of the actual drive pulse signal from the photointerrupter PI(A) 32 or PI(B) 33 (step S144). The result of the computation is used as the current driving speed of the shake correcting apparatus to determine the applied voltage and the PWM value in the aforementioned step S141 when this subroutine is executed next time.

If the flow enters this subroutine due to the centering operation, as opposed to the above case, the current position data "LENSPOSI" of the shake correcting apparatus (lens) and the total shift amount "NOBENO" of the shake correcting apparatus are updated and counted based on the drive pulse signal input in step S142 (step S145).

This process is performed as the output of the PI output processor 34 is sent to the SCA current position data storage section 42 and the SCA total shift amount count storage section 44. The count and memory data (contents) in the SCA current position data storage section 42 and the SCA total shift amount count storage section 44 are used as data for determining the centering operation mode and monitoring the status of the centering operation.

It is then determined if the directional signal for the shake correcting apparatus which is output from the PI output processor 34 has changed (step S146). When the directional signal has not changed (NO), the returning operation of the shake correcting apparatus has not occurred, so that the flow returns from this subroutine. When the directional signal has changed (YES), the returning operation of the shake correcting apparatus has occurred. In this case, the SCA return number data "ORINO" of the shake correcting apparatus is counted up in step S147 after which the flow returns from this subroutine.

As described above, in the subroutine "SCA Driving" in FIG. 14, the output signal (actual drive pulse signal/ directional signal) from the PI output processor 34 changes in accordance with the drive status of the shake correcting apparatus and this change is counted and stored. It is therefore possible to determine the current position of the shake correcting apparatus and the driving direction thereof by means of the SCA data determining section 6 in the controller 4.

Although the foregoing description has been given mainly for one axis of the image surface with respect to the mode of setting the initial position of the shake correcting apparatus by the controller 4 in this embodiment, the shaking of a camera occurs at random with respect to two axial directions, namely the X axial direction and Y axial direction, two shake correcting apparatuses are provided for the two axes accordingly. Of course, the above-described actual drive pulse signal and directional signal of the shake correcting apparatus also exist for two axes, and the centering operation and the determination of the centering operation are executed in association with the data for the two axes.

In this case, the determinations of the centering operation mode (pattern A or pattern B) may be made independently in association with the operational statuses of the shake correcting apparatus associated with the X axis and Y axis of the image surface. When the pattern A of the centering operation is selected with respect to one of the axes, this selection may be given priority over the other so that the centering operation should be performed in accordance with the pattern A for both axes.

According to the above-described embodiment, the following structures may be obtained.

(1) A camera having an apparatus for detecting the shaking of the camera and correcting the shaking based on the detection result, comprising:

operational status determining means for determining the operational status of the camera;

SCA driving means for driving the shake correcting apparatus to correct the shaking of the camera; and IPS mode changing means for changing the method of setting the initial position of the shake correcting apparatus that is driven by the SCA driving means, based on the determination result from the operational status determining section.

According to the shake correcting apparatus as recited in paragraph (1), the method of setting the initial position of the shake correcting apparatus is changed based on the operational statuses of the camera and the shake correcting apparatus, and when an error in the current position data of the shake correcting apparatus is accumulated, the initial-position setting (centering operation) of the shake correcting apparatus is performed in such a way as to cancel this error. Accordingly, the position of the shake correction in the shake correcting apparatus operation is detected accurately and the error is reset as needed. The time needed for the initial-position setting operation (centering operation) requires a shorter time to secure the rapid photographing performance and to minimize the power consumed by the driving the actuator in the centering operation. (2) The shake correcting apparatus as recited in paragraph (1) is characterized in that the determination by the operational status determining means is based on the number of pictures taken by the camera.

According to the shake correcting apparatus as recited in paragraph (2), the method of setting the initial position of the shake correcting apparatus is changed based on the number of pictures taken by the camera, and when the number of photographs taken in accordance with the shake correcting operation becomes equal to or greater than a predetermined value and an error in the current position data of the shake correcting apparatus is accumulated, the initial-position setting (centering operation) of the shake correcting apparatus is performed in such a way as to cancel this error. Accordingly, the position of the shake correction in the shake correcting apparatus operation is detected accurately and the error is reset as needed. The time needed for the initial-position setting operation (centering operation) requires a shorter time to secure the rapid photographing performance and to minimize the power consumed by the driving the actuator in the centering operation.

(3) The shake correcting apparatus as recited in paragraph (1) is characterized in that the determination by the operational status determining means is based on the number of returns when the shake correcting apparatus is in operation.

According to the shake correcting apparatus as recited in paragraph (3), the method of setting the initial position of the shake correcting apparatus is changed based on the number of returns when the shake correcting apparatus is in operation, and when the number of returns with the shake correcting operation in operation becomes equal to or greater than a predetermined value and an error in the current position data of the shake correcting apparatus is accumulated, the initial-position setting (centering operation) of the shake correcting apparatus is performed in such a way as to cancel this error. Accordingly, the position of the shake correction in the shake correcting apparatus operation is detected accurately and the error is reset as needed. The time needed for the initial-position setting operation (centering operation) requires a shorter time to secure the rapid photographing performance and to minimize the power consumed by the driving the actuator in the centering operation.

(4) The shake correcting apparatus as recited in paragraph (1) is characterized in that the determination by the operational status determining means is based on the total shift amount of the shake correcting apparatus.

According to the shake correcting apparatus as recited in paragraph (4), the method of setting the initial position of the shake correcting apparatus is changed based on the total shift amount of the shake correcting apparatus in operation, and when the total shift amount of the shake correcting apparatus in operation becomes equal to or greater than a predetermined value and an error in the current position data of the shake correcting apparatus is accumulated, the initial-position setting (centering operation) of the shake correcting apparatus is performed in such a way as to cancel this error. Accordingly, the shake correcting position for the shake correcting apparatus operation is detected accurately and the error is reset as needed. The time needed for the initial-position setting operation (centering operation) requires a shorter time to secure the rapid photographing performance and to minimize the power consumed by the driving the actuator in the centering operation.

(5) The shake correcting apparatus as recited in paragraph (1) is characterized in that the determination by the operational status determining means is based on the manipulation of the power switch of the camera.

According to the shake correcting apparatus as recited in paragraph (5), the method of setting the initial position of the shake correcting apparatus is changed based on the manipulation (ON) of the power switch of the camera, and even when an error occurs in the current position data due to the positional shift of the shake correcting apparatus (lens) due to the carrying of the camera, an excess vibration or the like until the power switch is operation (ON), the initial-position setting (centering operation) of the shake correcting apparatus is performed in such a way as to reset this error. It is therefore possible to accurately detect the shake correcting position for the shake correcting operation even immediately after the power switch is manipulated (ON).

(6) The shake correcting apparatus as recited in paragraph (1) is characterized in that the determination by the operational status determining means is based on the selection of the shake preventing mode as the photographing mode of the camera.

According to the shake correcting apparatus as recited in paragraph (6), the method of setting the initial position of the shake correcting apparatus is changed based on the selection of the shake preventing mode as the photographing mode of the camera, and even when an error occurs in the current position data due to the positional shift of the shake correcting apparatus (lens) due to the carrying of the camera, an excess vibration or the like until the shake preventing mode is selected, the initial-position setting (centering operation) of the shake correcting apparatus is performed in such a way as to reset this error. It is therefore possible to accurately detect the shake correcting position for the shake correcting operation even immediately after the power switch is manipulated (ON).

(7) The shake correcting apparatus as recited in paragraph (1) is characterized in that the determination by the operational status determining means is based on the selection of the continuous photographing mode as the photographing mode of the camera and on the continuous photographing status.

According to the shake correcting apparatus as recited in paragraph (7), the method of setting the initial position of the shake correcting apparatus is changed based on the status of the execution of the continuous photographing mode involving the shake correcting operation, and when a relatively large number of photographs are taken in the continuous photographing mode involving the shake correcting operation and an error in the current position data of the shake correcting apparatus is accumulated, the initial-position setting (centering operation) of the shake correcting apparatus is performed in such a way as to cancel this error. Accordingly, the position of the shake correction in the shake correcting apparatus operation is detected accurately and the error is reset as needed. The time needed for the initial-position setting operation (centering operation) requires a shorter time to secure the rapid photographing performance and to minimize the power consumed by the driving the actuator in the centering operation.

(8) The shake correcting apparatus as recited in paragraph (1) is characterized in that when the method of setting the initial position of the shake correcting apparatus is changed by the initial-position setting mode changing means based on the determination by the operational status determining means, the data on which the operational status determining means determines is reset.

According to the shake correcting apparatus as recited in paragraph (8), the method of setting the initial position of the shake correcting apparatus is changed based on the operational statuses of the camera and the shake correcting apparatus, and when an error in the current position data of the shake correcting apparatus is accumulated, the initial-position setting (centering operation) of the shake correcting apparatus is performed in such a way as to cancel this error and when the initial-position setting operation (centering operation) is performed, the parameters that are used to change the method of setting the initial-position setting method. Accordingly, the position of the shake correction in the shake correcting apparatus operation is detected accurately and the error is reset as needed. The time needed for the initial-position setting operation (centering operation) requires a shorter time to secure the rapid photographing performance and to minimize the power consumed by the driving the actuator in the centering operation.

(9) The shake correcting apparatus as recited in paragraphs (1) to (7) is characterized in that when the method of setting the initial position of the shake correcting apparatus is changed by the initial-position setting mode changing means based on the determination by the operational status determining means, the shake correcting apparatus is shifted to the end of the operational range thereof to set the initial position.

According to the shake correcting apparatus as recited in paragraph (9), when the method of setting the initial position of the shake correcting apparatus is changed based on the operational statuses of the camera and the shake correcting apparatus, the shake correcting apparatus is shifted to the end of the operational range thereof. Accordingly, the position of the shake correction in the shake correcting apparatus operation is detected accurately and the error is reset as needed. The time needed for the initial-position setting operation (centering operation) requires a shorter time to secure the rapid photographing performance and to minimize the power consumed by the driving the actuator in the centering operation.

(10) A driver for a shake correcting apparatus comprising:
  shake correcting means for detecting the shaking of a camera and correcting the shaking; and
  altering means for selectively altering the fast setting of the initial position of the shake correcting means but with a low precision in accordance with the operational status of the camera, or the slow setting of the initial position but with a high precision.

According to the shake correcting apparatus as recited in claim (1), the optimal method of setting the initial position is selected in accordance with the operational status of the camera, thus making it possible to prevent the wasteful power consumption and secure the rapid photographing performance. The determination of the operational status of the camera may be performed by the operational status determining means as recited in paragraphs (2) to (7).

This invention, as described in detail above, can provide a shake correcting apparatus for a camera which sets the initial position in the minimum centering operation, thus reducing the consumed power and ensuring the rapid photographing performance.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A shake correcting apparatus for a camera, which comprises:
  shake detecting means for detecting a shake state of a camera;
  shake correcting means for executing shake correction based on a detection result from said shake detecting means;
  shake correction driving means for driving said shake correcting means;
  relative position detecting means for detecting a relative position state of said shake correcting means;
  end position detecting means for detecting an end position state of said shake correcting means;
  first initial-position setting means for finding end positions of a movable range of said shake correcting means and for deriving a center position of the correction range of said shake correcting means from said end positions, said center position being set as an initial position for initialization of said shake correcting means;
  second initial-position setting means for obtaining a difference between a current position of said shake correcting means and said center position, said difference being set as an initialization movement distance for moving said shake correcting means to said center position for initialization of said shake correcting means, based on a detection result from said relative position detecting means;
  discriminating means for discriminating at least one of an operational status of a camera and history data of shake correction driving; and
  selective execution means for selecting either one of said first initial-position setting means and said second initial-position setting means to perform initialization of said shake correcting means based on a discrimination result from said discriminating means, and for causing said shake correction driving means to drive said shake correcting means to execute the initialization of said shake correcting means.

2. The shake correcting apparatus according to claim 1, wherein said operational status of a camera discriminated by said discriminating means includes at least one of data relating to manipulation of a power switch, data relating to selection of a shake preventing mode and data relating to selection of a continuous photographing mode.

3. The shake correcting apparatus according to claim 1, wherein said history data of shake correction driving includes at least one of frame number data, return number data of a shake correcting operation and total number data relating to a total number of shake correcting operations.

4. The shake correcting apparatus according to claim 3, wherein said discriminating means includes storage means for respectively storing reference values of said return number data and said total number data, and comparing means for comparing said reference values stored in said storage means with individual values of said return number data and said total number data.

5. The shake correcting apparatus according to claim 4, wherein when said initialization of said shake correcting means is performed by said first initial-position setting means, said return number data and said total number data are reset.

6. The shake correcting apparatus according to claim 1, wherein said first initial-position setting means sets said shake correcting means to first move toward a closer one of said two end positions and then to said center position for initialization of said shake correcting means.

7. The shake correcting apparatus according to claim 1, wherein two shake correcting apparatuses are incorporated in a camera so as to respectively remove shakes caused in directions of two axes perpendicular to each other, and wherein when one of the two shake correcting apparatuses performs initialization of the shake correcting means thereof by means of the first initial-position setting means thereof based on a discrimination result from said discriminating means, the other of the two shake correcting apparatuses performs initialization of the shake correcting means thereof by means of the first initial-position setting means thereof.

8. A shake correcting apparatus for a camera, comprising:

shake detecting means for detecting a shake state of a camera;

shake correcting means for executing shake correction based on a detection result from said shake detecting means;

shake correction driving means for driving said shake correcting means;

relative position detecting means for detecting a relative position state of said shake correcting means;

end position detecting means for detecting an end position state of said shake correcting means;

discriminating means for discriminating at least one of an operational status of a camera and history data of shake correction driving;

initializing means for setting an initial position of shake correction for initialization of said shake correcting means, based on a detection result from said relative position detecting means; and changing means for changing a driving mode of driving said shake correcting means to said initial position set by said initializing means, based on a discrimination result from said discriminating means.

9. The shake correcting apparatus according to claim 8, wherein said discriminating means determines the discrimination result based on a discrimination of the number of photographs taken by a camera.

10. The shake correcting apparatus according to claim 8, further comprising counting means for counting a number of returns within a correction driving range when said shake correcting apparatus is in use, and wherein said discriminating means determines the discrimination result based on a discrimination of a counting result from said counting means.

11. The shake correcting apparatus according to claim 8, further comprising detecting means for detecting a total shift amount for correction of said shake correcting apparatus, and wherein said discriminating means determines the discrimination result based on a discrimination of said total shift amount for correction.

12. The shake correcting apparatus according to claim 8, wherein said discriminating means determines the discrimination result based on a discrimination of manipulation of a power switch of a camera.

13. The shake correcting apparatus according to claim 8, wherein said discriminating means determines the discrimination result based on a discrimination of a selected shake preventing mode as a photographing mode of a camera.

14. The shake correcting apparatus according to claim 8, wherein said discriminating means determines the discrimination result based on a discrimination of a selected continuous photographing mode as a photographing mode of a camera.

15. The shake correcting apparatus according to claim 8, wherein when said changing means changes the driving mode of driving said shake correcting means based on the discrimination result from said discriminating means to a high precision initialization mode, data on which discrimination by said discriminating means is based is reset.

16. The shake correcting apparatus according to claim 8, wherein when said changing means changes the driving mode of said shake correcting means based on the discrimination result from said discriminating means, an initial position is set at a shifted end of an operational range of said shake correcting apparatus.

17. The shake correcting apparatus according to claim 8, wherein said initial setting means comprises:

first initial-position setting means for finding end positions of a correction range of said shake correcting means and for deriving a center position of the correction range of said shake correcting means from said end positions, said center position being set as an initial position for initialization of said shake correcting means; and second initial-position setting means for obtaining a difference between a current position of said shake correcting means and said center position, said difference being set as an initialization movement distance for moving said shake correcting means to said center position for initialization of said shake correcting means;

wherein said changing means selects one of said first initial-position setting means and said second initial-position setting means based on a discrimination result from said discriminating means to change said driving mode.

18. A shake correcting apparatus for a camera, comprising:

shake correcting means for detecting a shake state of a camera and performing shake correction;

relative position detecting means for detecting a relative position state of said shake correcting means;

absolute position detecting means for detecting an absolute position state of said shake correcting means;

first initial-position setting means for finding a predetermined position of a correction range of said shake correcting means based on said absolute position detecting means, and for setting an initial position with said predetermined position taken as a reference;

second initial-position setting means for finding said predetermined position by said relative position detecting means, obtaining a difference between a detected current position of said shake correcting means and said center position and moving said current position of said shake correcting means by said difference to set said initial position; and selective execution means for selecting either one of said first initial-position setting means and said second initial-position setting means to perform selection of an initial position setting method of said shake correcting means.

19. The shake correcting apparatus according to claim 18, further comprising:

pulse generating means for generating a pulse in accordance with a detected movement of said shake correcting means; and count means for counting said pulse generated by said pulse generating means with said predetermined position of said correction range of said shake correcting means taken as a reference, whereby said current position is detected based on a count value from said count means.

* * * * *